(12) United States Patent
Genser (10) Patent No.: US 7,153,396 B2
(45) Date of Patent: *Dec. 26, 2006

(54) ROTATING EVAPORATOR WITH PROCESS-DEPENDENT ROTATING SPEED REGULATION

(76) Inventor: Hans Georg Genser, Bolleinsmuhle, D-91639, Wolframs-Eschenbach (DE)

( * ) Notice: Subject to any disclaimer, the term of this patent is extended or adjusted under 35 U.S.C. 154(b) by 660 days.

This patent is subject to a terminal disclaimer.

(21) Appl. No.: 10/098,770

(22) Filed: Mar. 14, 2002

(65) Prior Publication Data

US 2003/0000651 A1 Jan. 2, 2003

(30) Foreign Application Priority Data

Mar. 23, 2001 (DE) .................................. 101 14 434

(51) Int. Cl.
*B01D 3/08* (2006.01)
*B01D 3/42* (2006.01)
(52) U.S. Cl. .................. 203/1; 159/6.1; 159/44; 202/238; 202/189; 422/72
(58) Field of Classification Search ............... 202/182, 202/238, 189; 159/6.1, 44; 422/72; 203/1
See application file for complete search history.

(56) References Cited

U.S. PATENT DOCUMENTS

| | | | | |
|---|---|---|---|---|
| 4,738,295 A | * | 4/1988 | Genser ..................... 159/6.1 |
| 4,780,178 A | * | 10/1988 | Yoshida et al. ............. 159/6.1 |
| 4,790,911 A | * | 12/1988 | Parkinson .................. 202/205 |
| 4,913,777 A | * | 4/1990 | Parkinson .................. 202/205 |
| 5,611,895 A | * | 3/1997 | Genser ...................... 202/182 |
| 6,682,631 B1 | * | 1/2004 | Cole ......................... 159/6.1 |
| 6,740,206 B1 | * | 5/2004 | Genser ...................... 202/238 |

FOREIGN PATENT DOCUMENTS

| | | |
|---|---|---|
| CH | 411 783 | 11/1966 |
| DE | 1 224 062 | 7/1963 |
| DE | 3330 764 A1 | 4/1984 |
| DE | 3511 981 C2 | 10/1987 |
| DE | 199 09 228 A1 | 7/2000 |
| DE | 3522 607 C2 | 10/2001 |

* cited by examiner

*Primary Examiner*—N. Bhat
(74) *Attorney, Agent, or Firm*—Pearne & Gordon LLP (57) ABSTRACT

In a rotary evaporator, the rotating speed of the rotating flask is automatically controlled or regulated dependent upon a detected process value, particularly the vibration behavior or the mass moment of inertia of the rotating flask.

38 Claims, 3 Drawing Sheets

ROTATING EVAPORATOR WITH PROCESS-DEPENDENT ROTATING SPEED REGULATION

BACKGROUND OF THE INVENTION

The invention relates to a device and a process for evaporating at least one substance.

Devices referred to as rotary evaporators are known, for evaporating substances, particularly for evaporating solvents when concentrating or distilling pharmaceutical or chemical products. With these rotary evaporators, the liquid substances to be evaporated are placed into the cavity of a rotating flask (evaporation vessel) generally rotatable in a heating bath. By rotating the flask, a thin liquid film is generated on the inside of the rotating flask, from which the substances, particularly the solvent, evaporate. A certain portion of the substance or the solvent also evaporates directly from the surface of the liquid in the rotating flask. The vapor is conveyed from the rotating flask via a vapor line to a condenser where it condenses out again. In general, a negative pressure or vacuum is also generated in the rotating flask in order to increase the vapor pressure of the substances to be evaporated and to protect the product. The vapor line is connected in a passage area to the rotating flask via a rotatable connection. The connection point is sealed by means of a rotary gasket.

Patent specification DE-PS 1 224 062 discloses a rotary evaporator with a work flask that can be rotated around its axis of symmetry via a motorized drive. The work flask can also pivot freely around a swiveling axis running perpendicular to its axis of symmetry, whereby it floats freely on the surface of a water bath. In a rotary evaporator with such a pendulum system, the force of the weight of the work flask with the substance contained therein and to be evaporated is held in the water bath solely by the buoyancy of the work flask and in this way, torques and forces on the mounting of the work flask are clearly reduced.

A process for vacuum rotary evaporation as well as a device for carrying out the process is known from DE 35 11 981 C2. This known rotary evaporator has a pendulum system in which the rotating flask is held floating with free buoyancy on or in a liquid bath. The vertical position of the rotating flask relative to the surface of the liquid of the liquid bath is measured directly or indirectly and used as the regulating value of a regulating path or as control value of a control path to regulate or control the filling content of the rotating flask. The vertical position of the rotating flask relative to the surface of the liquid represents a direct measure for the filling content of the rotating flask, that is, the quantity of liquid that is in the rotating flask. As setting value to regulate this vertical position and thus the filling content of the rotating flask, the directly fed liquid to be evaporated is used. A corresponding setting element (magnet valve) makes it possible to feed liquid to be evaporated in rotating flasks and blocks them in order to keep at the desired setting value the filling content of the rotating flask with the liquid to be evaporated. In this way, there is always enough medium to be processed in the rotating flask that its inner surface is predominantly wetted with the medium during the rotation. The rotary evaporator thereby works with a good efficiency. To detect the vertical position of the rotating flask relative to surface of the liquid, the change in its angle position relative to a stationary mounting, e.g. a stand, can be measured with an inclinometer containing a rotary potentiometer, or a resistance that is perpendicular to the surface of the liquid and changes with the vertical position.

Another rotary evaporation process and another rotary evaporator are known from DE 35 22 607 A1 in which the mass content of the rotating flask or a change in this mass content corresponding to the rotating flask penetrating into bath liquid is ascertained by weighing and the result of the weighing is then used as regulating value or control value for the evaporation process. The rotating flask is held floating with buoyancy on or in a liquid bath, particularly by a pendulum system or a linear lift and lowering system. The weighing of the mass content of the rotating flask can be determined indirectly by weighing the bath with the liquid or weighing the rotating flask with drive system and stand or condenser or by weighing the flask mass content and the distillate mass or by weighing the product before it is inserted into rotating flask or measuring the volume of the rotating flask, or also weighing the quantity of distillate during or after the distillation or ascertainment of its volume. Since the power consumption of the driving torque of the drive also changes when the flask mass content changes, the power consumption or the driving torque or braking torque of the drive of the rotating flask system can also be directly or indirectly measured and used as a regulating value or control value of the evaporate process. In another variant of this known rotary evaporator, the buoyancy on the rotating flask in the bath can be measured and used as a regulating value or control value. The buoyancy can be measured particularly by force, tension, pressure or torsion measuring elements, particularly extensometers, to ascertain the buoyancy force. The buoyancy is also a direct measure for the flask mass content. As regulation for the evaporation process, only the product supply is mentioned in DE 35 22 607 A1, with a reference to the older DE 35 11 981 C2. The mass of the total content of the rotating flask is thus regulated or controlled. Further regulations or controls besides that of the level of filling of the rotating flask are not indicated.

Another form of construction of a rotary evaporator is known from DE 33 30 764 A1 in which the rotating speed of the rotating flask is scanned and the rotating speed is slowed in time-controlled manner within a predetermined interval from a predetermined starting speed to a lower final speed.

Another rotary evaporator is known from CH 411 783 in which the rotating speed of the rotating flask can be modified. CH 411 783 does not mention the conditions based on which the rotating speed is changed.

Another publication, DE 199 09 228 A1, then discloses a process and a device for condensing liquid samples to a specific residual volume with a rotating evaporation flask designed bulb-shaped with a bulging upper area and a tapering extension in the lower area. This evaporation system differs from the previously described rotary evaporators firstly in that the axis of rotation of the evaporation flask is oriented vertically, that is parallel to the force of gravity. In this way, the liquid medium gathers in the lower, tapered area of the evaporation flask as long as the flask does not rotate. For an evaporation process, however, the evaporation flask is then rotated quickly enough that the entire medium rises upward into the bulging area due to centrifugal forces and a thick film forms there on the inner wall. The rising of the medium into the bulging area is controlled with a light barrier arranged at the transition between the bulging area and the extension, to detect the surface of the liquid. During the evaporation process, there is no medium in the lower area or extension of the flask. In addition, the film in the bulging area of the flask is not constantly renewed or redrawn during the evaporation process as is the case in a typical rotary evaporator, rather it remains on the inner wall of the flask until only the residual film is left. For this reason, the efficiency or the evaporation capacity of this rotary evaporator is limited.

BRIEF SUMMARY OF THE INVENTION

The invention is based on the technical problem of indicating a device and a process for evaporating at least one substance with good efficiency.

This technical problem is solved according to the invention.

The device according to the invention for evaporating at least one substance comprises a) a rotating container (or work vessel) for receiving a medium (or a product) that contains the at least one substance to be evaporated or consists of it, and b) a drive means for rotating (turning) the rotating container around an axis of rotation (turning axis) oriented against gravity (or: gravitational force, force of gravity), that is, not parallel to gravity, as well as c) a control mechanism in active connection with the drive means c1) for direct or indirect detection of at least one process value and c2) for automatic (autonomous) setting or adjusting or controlling or regulating of the rotating speed of the rotating container depending on the process value/s detected, whereby d) the control mechanism controls or regulates the rotating speed of the rotating container in such a way that in the lower area of the rotary container, there is a reservoir of the medium drawn downward by force of gravity and out of which, at least on a portion of the inner wall of the rotary container, a film of the medium is formed that is preferably at least approximately uniform and/or favorable for the evaporation and is constantly at least partially renewed or at least partially drawn up again at each rotation of the rotating container.

The term evaporation in this connection is intended to mean all procedures in which a substance changes from a nongaseous or vaporous phase into a gas phase or vapor phase, that is, it comprises in particular the evaporation of a liquid substance into vapor in the narrower sense and also the melting and subsequent evaporation or sublimation of a solid substance into vapor. For this reason, the device and the process for evaporating at least one substance could also be designated as a device and process for converting at least one non-gaseous substance into the gas or vapor phase.

The process according to the invention for evaporating at least one substance comprises the following process steps:

a) Inserting a medium containing the at least one substance or consisting of it, into a rotating container;

b) rotating the rotating container around an axis of rotation that is inclined against the force of gravity;

c) detecting at least one process value (directly or indirectly);

d) automatic controlling or regulating or setting or adjusting of the rotating speed of the rotating container depending on the at least one process value detected in such a way that in the lower area of the rotating container, a reservoir of the medium drawn downward by the force of gravity is formed out of which, at least on a portion of the inner wall of the rotating container, a film of the medium is generated or drawn up that is preferably at least approximately uniform and/or favorable for the evaporation and is constantly at least partially renewed or is at least partially formed again at each rotation of the rotating container.

The invention starts with the fact, already described in DE 35 11 981 C2 as well, that the efficiency of the rotary evaporator is all the better the larger the portion of the rotating container's inner surface wetted by the medium (substance to be evaporated, if necessary with transfer substances or solvents) situated in the rotating container is during the rotation. That is, a film (or layer) of the medium to be evaporated that is constantly renewed and as ideal as possible for the evaporation should be generated on the inner wall of the rotating container in such a way that the largest possible evaporation surface and the greatest possible rate of evaporation or greatest efficiency is thereby achieved.

Whereas to achieve this goal DE 35 11 981 C2 as well as DE 35 22 607 A1 use the method of always providing enough medium to be processed in the rotating flask that the inner surface is predominantly wetted with the medium during the rotation, the invention takes another route that can also be taken in addition to or as a supplement to the solution according to the state of the art.

The invention is firstly based on the consideration that to adapt or increase the evaporation capacity, particularly the distillation capacity or concentration capacity, of a rotary evaporator, an essential process value is the rotating speed or turning speed (angular velocity) of the rotating container. In particular, the rotating speed of the rotating container directly influences the formation, quality and expansion of the film (the thin layer) of the medium with the substance to be evaporated on the inside of the rotating container. Since the substance evaporates from this film, the rotating speed also directly influences the evaporation capacity of the rotary evaporator.

The invention is based on the further consideration of automatically controlling or regulating the rotating speed of the rotating container and making this control or regulation of the rotating speed of the rotating container dependent on at least one other indirectly or directly detected process value for the evaporation process. In this way, changes or excessive deviations of the current process conditions or process values can be at least partially prevented or balanced out by a corresponding adjustment of the rotating speed of the rotating container.

By appropriately setting or adjusting the rotating speed of the rotating container, a film (or layer) of the medium is generated at least on a portion of the inner wall of the rotating container. In this way, the evaporation surface of the medium is considerably increased. The film of the medium should be as uniform as possible over the inner surface of the rotating container, in connection with which it is especially advantageous if the film is as coherent as possible and the largest possible surface of the inner wall of the rotating container is covered or wetted. The evaporation capacity (or evaporation rate) of the rotary evaporator can thus be set as high as possible or optimized by control or regulation of the rotating speed of the rotating container.

There will be a higher level of the medium in the lower area of the rotating container, at least during a predominant period of the evaporation process, that is, there will be a larger portion of the medium drawn downward by the force of gravity as a reservoir, from which the film of the medium is formed on the inner surface of the rotating container due to the rotation at adapted rotating speed and the resulting pulling and centrifugal forces. At each passage of the inner wall of the rotating container through this reservoir of the medium, the inner wall pulls adhering medium along, which forms into a film over the inner wall of the rotating container. During the rotation of the rotating container, the substance or substances then evaporates or evaporate from the film and when the reservoir is reached, the film is at least partially renewed or regenerated again. This constant renewal of the film of the medium prevents the forming of a stationary concentration precipitation inside the film along its thickness from the inside to the outside (radial concerned gradient) and thereby the forming on the film surface of a "crust" or "skin" of non-evaporated residual substance or low-solvent residual medium hindering the evaporation process. In addition, the formation of a stationary film on the inner wall of the rotating container is also prevented.

The formation of the film of the medium on the inner wall of the rotating container is a complex procedure that depends on the reciprocal action of the cohesive forces in the medium and the adhesion forces between the medium and the container wall of the rotating container on the one hand and, on the other hand, on the gravity (or: gravitational force, force of gravity) acting additionally on the medium and the centrifugal forces generated by the rotation. Through the corresponding change in centrifugal forces, the rotating speed adaptation according to the invention influences this process of film formation until an optimal film is produced.

Particularly significant as process values are the material characteristics of the medium, such as viscosity, foaming behavior, transfer behavior (especially for powders, granulates or other solid products). The properties of the medium may also be temperature-dependent such that the process temperature also plays a role.

In particular, the following process values (or: process factors, process parameters) can be taken into consideration during the automatic setting or adjustment of the rotating speed of the rotating container;
viscosity of the product that is in the rotating container
temperature of the product that is in the rotating container
transfer behavior of powders, granulates or other solid products in the rotating container
foaming of the product in the rotating container
vibrations or oscillations of components of the rotary evaporator, particularly the rotating container, that can be caused by mass imbalances or resonance, for example
behavior of the water or heat transfer bath, particularly spurting of the water or the heat transfer medium
efficiency of the rotating container drive.

By adjusting the rotating speed of the rotating container, depending on one or more of these process values the capacity of the rotary evaporator can then be optimized among the other given conditions.

In a particularly advantageous form of construction, the viscosity of the medium is used as process value. A high viscosity of the medium that increases or was already present from the beginning can cause the formation of a stationary film on the inner wall of the rotating container or a portion thereof, which adheres to the inner wall. In this case, the rotating speed of the rotating container is modified, generally reduced, if necessary according to a predetermined schedule, during which intermediate accelerations may also take place in order to achieve at all the new formation of a film from the reservoir or the development of a reservoir again.

The relative speed between the medium and the inner wall of the rotating container, particularly dependent on the viscosity of the medium, is preferably detected and regulated or controlled as process value.

In the technical implementation of the invention, a regulating circuit is usually built up, the regulating value/s of which is/are the process value/s or the measuring or sensor signals or measured values corresponding to the process value/s and the setting value of which is the rotating speed of the rotating container.

The rotary evaporation system according to the invention is just as suitable for media in liquid phase as for media in solid phase, particularly in powder or granulate form.

In the case of medium formed from solid particles (grains), the rotating speed of the rotating container is preferably controlled or regulated in such a way that particles of the substance/s to be evaporated or the medium are mixed as well as possible.

The rotating speed of the rotating container is furthermore preferably set so as to achieve the best possible heat transfer within the substances to be evaporated or the medium, particularly for solid materials.

Generally speaking, the device comprises a heat transfer bath into which the rotating container is or can be at least partially dipped during operation. The heat transfer bath generally serves as a heat source for setting a process temperature in the rotating container Since the heat transfer medium is generally also set in motion by the rotation of the rotating container, the heat transfer medium can be spun out or spurt out of the bath at excessively high rotating speeds. For this reason, either a general rotating speed limitation is provided for or the emergence of heat transfer medium from the bath is also monitored as process value and also taken into consideration for the control or regulation of the rotating speed.

In another advantageous form of construction, the device has a pendulum system such that the rotating container is additionally able to swivel around a swiveling axis freely at least in a predetermined swivel area. The control mechanism then preferably detects a pivoting angle of the rotating container relative to a reference position as the process value. This pivot angle changes namely with the rotating speed of the rotating container and vice versa. The axis of rotation is preferably oriented essentially orthogonally relative to the swiveling axis.

In a preferred form of construction, the axis of rotation is a primary axis of inertia (inherent axis) of the rotating container, preferably an axis of symmetry with respect to which the rotating container is designed rotationally symmetrical. In this way, a stable rotation of the (empty) rotating container is achieved without imbalances.

The rotation behavior of such a "balanced out" rotating container also changes, however, as soon as the medium (product) is filled in. The asymmetry of the mass distribution and the mass moment of inertia, introduced by the medium, causes the primary axis of inertia of the rotating container filled with medium to deviate from the axis of rotation. Because of this, periodically shifting forces and torques (imbalances) are transferred to the drive shaft and the rotation bearing that can cause inherent vibrations or can lead to resonance.

These basically undesired imbalances are made use of in particularly advantageous designs of the device and the process to control or regulate the rotating speed. The imbalances namely become less the more uniformly the medium is distributed around the axis of rotation, that is, the more uniform the film of the medium in the rotating container is.

For this reason, in a first design the mass distribution, mass moment of inertia and/or a change in the mass distribution or, respectively, in the mass moment of inertia of the substance/s to be evaporated or of the medium are detected as the process value/s.

This can take place particularly by measuring the imbalances. A further possibility to detect the mass moment of inertia consists in measuring the time required to accelerate or slow down the rotating container from a first rotating speed to a second rotating speed, which changes with the moment of inertia.

In an alternative second design, the vibrations or resonance generated by the imbalances can also be detected as the process value.

In a further design, the drive power required of the drive means in order to rotate the rotating container can also be detected as process value; it depends on the mass and the moment of inertia of the medium in the rotating container.

In all forms of construction, the control mechanism can control or regulate the rotating speed of the rotating container depending on a comparison of the current process value detected with the rotating container filled with the substance/s on the one hand and, on the other hand, the reference process value detected beforehand when the rotating container is not filled with the substance/s. This allows the measuring compensation or elimination of the influence of the rotating container itself.

In a special design, a foam formation in the rotating container is detected as process value. This form of construction is based on the consideration that a foam formation causes the product to be dragged into the vapor lines, condensers and distillate container on the one hand and, on the other hand, soils the sealing system and thus reduces the performance. The rotating speed is then set in such a way that the foam formation is as small as possible and at the same time the film formation of the medium has the largest possible surface and homogeneity. The rotating speed is set to a value such that as far as possible, little or no foaming occurs. In control or regulation terms, this can take place by taking into consideration at least one further process value or by predefining a minimum rotating speed (threshold value), for example.

At least one process value is preferably detected in all forms of construction for at least two different rotation angle positions of the rotating container and the rotating speed is controlled or regulated depending on the measured values of the process value for these at least two different rotation angle positions. This makes it possible to observe signal differences with rejection of common-mode interferences and is particularly advantageous for moment of inertia measurements. In particular, the rotating speed is controlled or regulated depending on the measured values of the process value for the at least two different rotation angle positions in such a way that discrepancies or variations between these measured values are within a predefined tolerance range.

A special further development consists of also changing the rotating direction of the rotating container, for example, to dissolve clumpings of powder, density differences in the medium or the like.

The rotating direction of the rotating container can also be included in the control or regulation process in such a way that it is controlled or regulated depending on at least one process value.

Detection of the various process values can be carried out with one or more sensors that can be selected from a number of known sensors, for example acoustic sensors;

sensors measuring by means of electromagnetic rays, particularly optic or infrared sensors or radar sensors;

position sensors, particularly level sensors, lay sensors or angle position indicators such as inclinometers;

sensors detecting electric and/or magnetic fields, particularly capacitive or inductive sensors, field strength sensors;

pressure and/or force and/or weight sensors and/or extension sensors;

electric current or power sensors.

BRIEF DESCRIPTION OF THE DRAWINGS

The invention is further explained below with the help of examples of execution. In this respect, the drawings are referred to, in which.

DETAILED DESCRIPTION OF THE INVENTION

Figure 1:
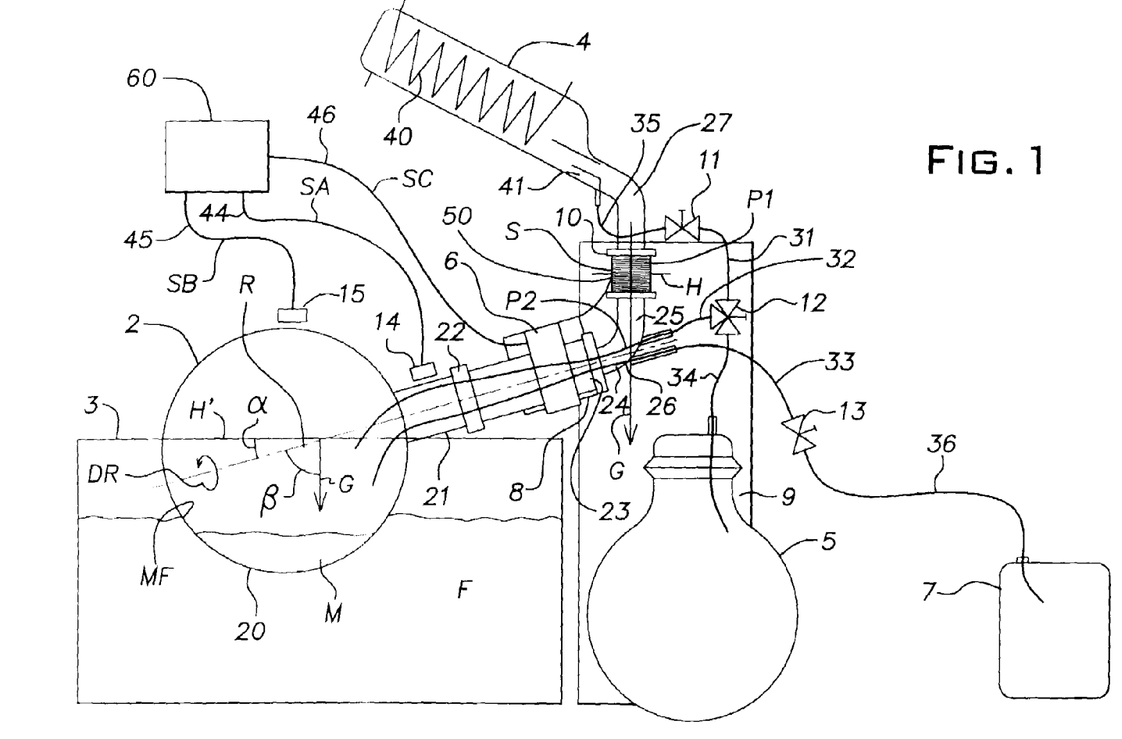
FIG. 1 shows a rotary evaporator with foam detection in a front view.
Figure 2:
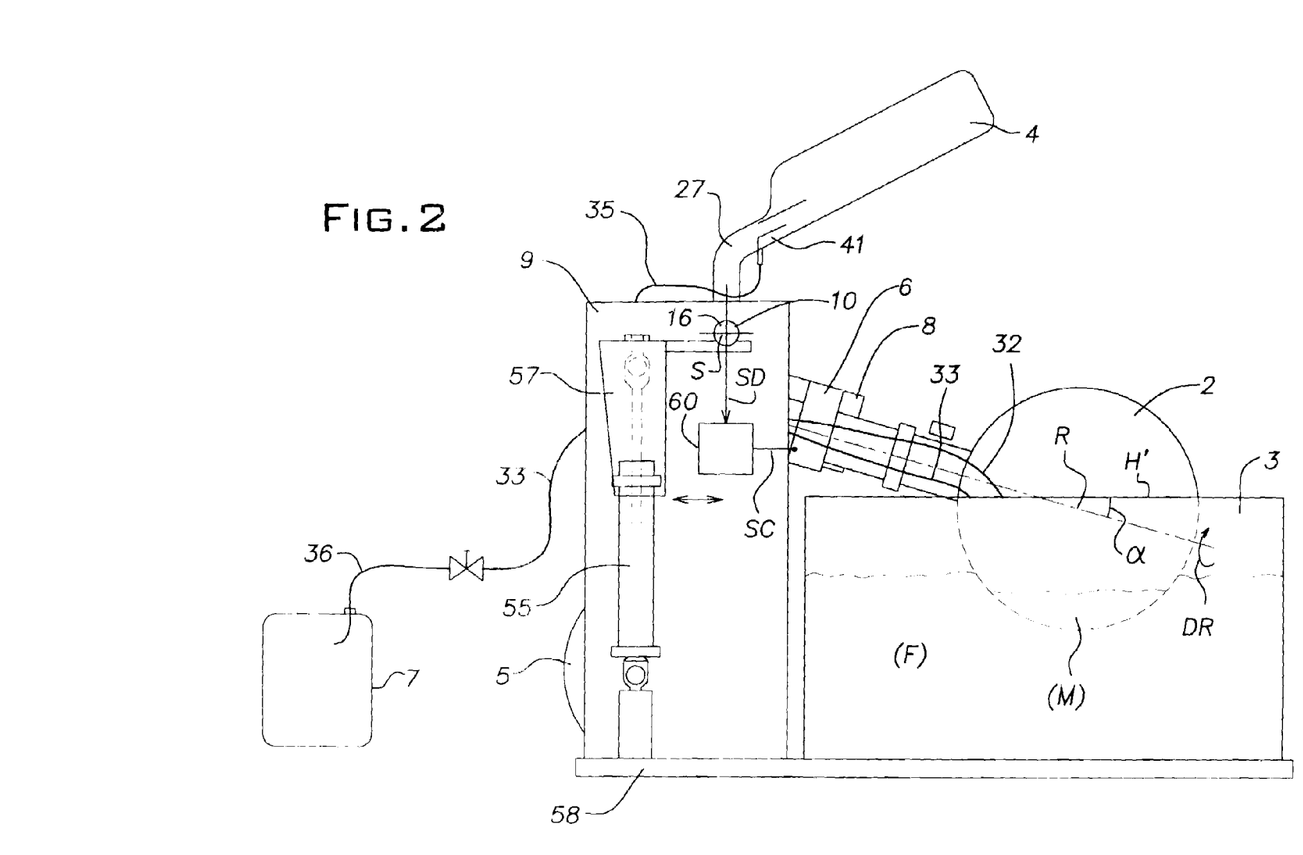
FIG. 2 shows a rotary evaporator with inclinometer in a rear view and FIG. 3 shows a portion of the rotary evaporator according to FIG. 2 in a sectional side view, each in schematic form. Parts and values corresponding to each other are provided with the same reference signs in FIG. 1 through FIG. 3.

The rotary evaporators according to FIG. 1 and FIG. 2 each comprise a rotating container (or: work vessel, rotating flask) 2 that can be rotated (turned) around an axis of rotation (turning axis) R via a drive means 6. The rotating container 2 dips into a liquid bath 3 with a liquid f. The liquid F. serves as heat transfer medium and can consist of water or, especially at higher temperatures, also of mineral or silicon oil or also of glycol. The inclination of the axis of rotation R relative to the horizontal H' oriented orthogonally relative to gravity (gravitational force) G is characterized by an angle $\alpha$ and the inclination of the axis of rotation R relative to the vertical oriented parallel to gravity is characterized by an angle $\beta$, where $\alpha + \beta = 90°$ and $\beta \neq 90°$.

At the opposite end of the drive means 6, a receiving device (connecting sleeve, hollow shaft) 23 is arranged that is stationary, that is, cannot be rotated at the same time, and surrounds and holds a line 26 to convey the gaseous, evaporated substance/s. The rotating sleeve 21 of the rotating container 20 is sealed off from the non-rotating line 26 and the related receiving device 23 via a rotating seal. The drive means 6 and the receiving device 23 with the line 26 attached in it are attached and held on a housing 8 that runs with a swivel area (swivel arm) upward approximately following the curve of the line 26 and is mounted in a swivel bearing 10.

The line 26 has a line area 24 running essentially coaxially relative to the axis of rotation R and a second line area 25 running essentially vertically, i.e., parallel to gravity G; these lines together form an acute angle of more than 90°, e.g. 100°, and are joined together via a bent area.

The vertical line area 25 ends in a compensating element 50 designed as a bellows, at the opposite side of which another, vertically extending line 27 is connected. A condenser 4 is connected to the side of the line 27 facing away from the compensating element 50.

The two lines 26 and 27 are held in the swivel bearing 10 and can be swiveled toward each other around a swiveling axis S. In this respect, the line 27 is held stationary in the illustrated position on a box-shaped support 9, while the line 26 can be swiveled around the swiveling axis S with the rotating container 2, the drive means 6 and the receiving device 23 arranged stationary relative to the line 26 with respect to the swiveling axis S. The swivel bearing 10 is also held in the support 9 in the position defined by the swiveling axis S. The swiveling axis S thus runs horizontal, i.e., perpendicular to gravity G.

The line 26 and the line 27 are generally made of glass or another rigid material that would be destroyed in the event of buckling or bending due to the swivel motion. For this reason, the two lines 26 and 27 are flexibly connected with each other via the compensating element 50, in such a way that a flexible flow connection between the two lines 26 and 27 is possible.

The rotating container 2 thus can be swiveled in the swivel bearing 10 around the swiveling axis S, thereby creating a pendulum system. For this reason, the swiveling axis and the swivel bearing 10 could also be referred to as a pendulum axis or pendulum bearing. FIG. 1 shows a position in which the line area 25 of the line 26 is oriented coaxially and parallel to the line 27 and thus to gravity G, and the bellows of the compensating element 50 is thus in a relaxed condition running with the center axis parallel to gravity G. If the rotating container 2 swivels around the swiveling axis S, the center axes of the line area 25, of the line 26, and of the line 27 then assume an angle relative to each other that corresponds to the swivel angle from the illustrated null position. Accordingly, if there is a clockwise swivel motion (in the illustration of FIG. 1), the rotating container 2 will rise upward from the liquid F of the liquid bath 3 and somewhat toward the left, in such a way that the angle α between the horizontal H' and the axis of rotation R becomes smaller and the angle β between the axis of rotation R and gravity G becomes greater. In the event of a counter-clockwise swivel motion, on the other hand, the rotating container 2 will dip more deeply into the liquid F of the liquid bath 3, such that the angle α becomes greater and the angle β becomes smaller. In other words, when there has been a swiveling toward the left, the intersection P2 between the center axis of the line part 25 and the axis of rotation R will migrate upward and toward the left and when there is counter-clockwise swiveling, it will migrate downward and toward the right.

In the illustrated examples of execution, the rotating container 2 is able to freely swivel around the swiveling axis S in such a way that depending on the filling and the inherent weight of the rotating container 2 and the result buoyancy in the liquid F, a balanced position is freely and automatically established as the swivel position.

An interface of the swiveling axis S with the horizontal H oriented perpendicular to gravity G is designated with P1. According to FIG. 1, the interface P1 of the swiveling axis S with the vertical plane established by gravity G and the axis of rotation R is in the center, i.e., in the intersection of the diagonal, of the compensating element 50, such that the deformation of the compensating element 50 can be kept to a minimum when the swivel motion around the swiveling axis S is being compensated.

As can be seen in FIG. 2, damping device 55 can also be provided that is connected via a counterweight 57 solidly with the swivel bearing 10 and provides for a mounting free of play and a damping of resonant vibrations of the rotating container 2. In particular, the damping device 55 may function hydraulically or have an oil filling.

In the bending area of the line 26 between the two line areas 24 and 25, two connections not described in greater detail are provided, by means of which the two thin lines 32 and 33 lead inside the line 26 and through the sleeve 21 into the receiving area 20 of the rotating container 2. These lines 32 and 33 serve to supply work substances into the rotating container 2. In this respect, the line 33 forms a feed line for feeding the product to be treated, particularly a liquid substance to be concentrated or distilled. In this respect, the line 33 is connected via a valve as sealing mechanism 13 and a subsequent further line 36 with a product container 7 containing the product. The further line 32 serves to return already evaporated liquid that has been condensed out again into the receiving area 20 of the rotating container 2.

Figure 3:
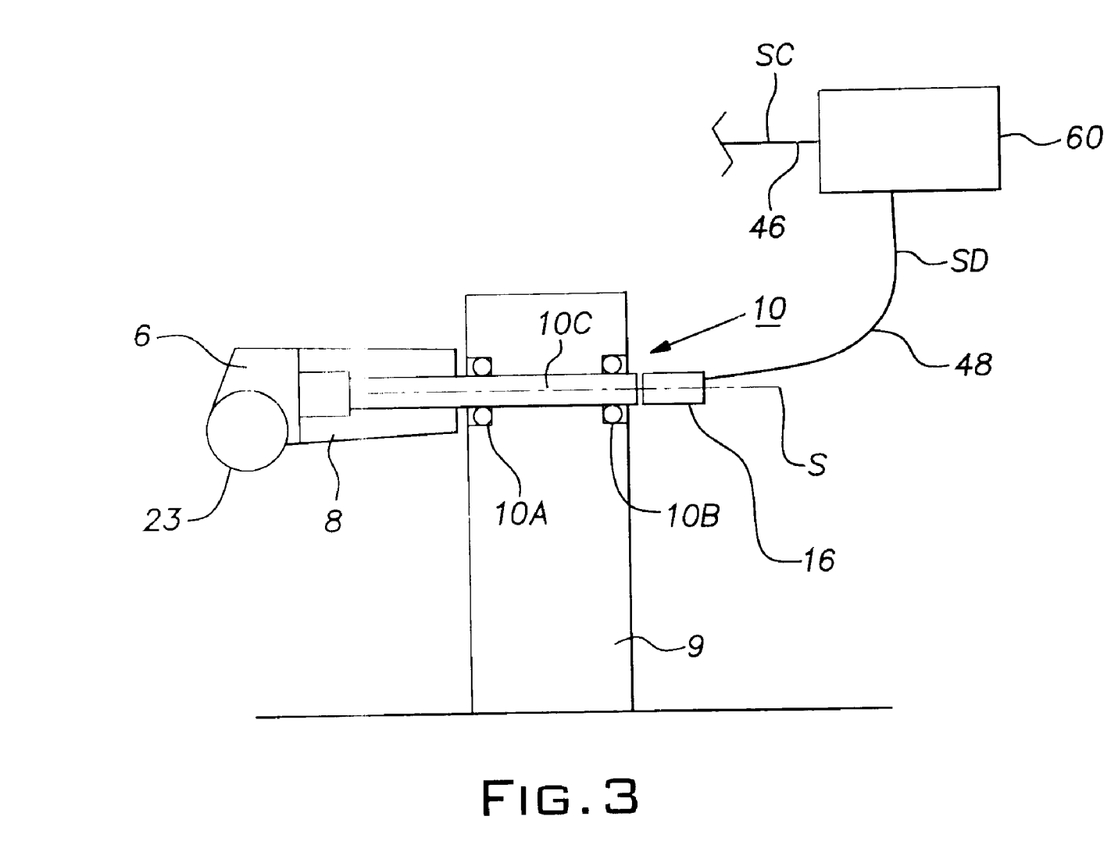

FIG. 3 shows a section of the rotary evaporator according to FIGS. 1 and 2, which shows the swivel bearing 10 in further details. The swivel bearing 10 comprises a swivel shaft 10C that is mounted in two partial bearings 10A and 10B, designed particularly as roll bearings, preferably ball bearings, on both sides of the column-like support 9 coaxially relative to the (geometric) swiveling axis S.

The rotating container 2 according to FIGS. 1 and 2 is preferably designed essentially rotationally symmetric to the axis of rotation R as an axis of symmetry and in this way, it can be rotated free of imbalance with no contents. The rotating container 2 comprises an essentially spherical receiving area 20 to receive the substance/s to be evaporated and a sleeve 21 connecting to an opening in the spherical receiving area 20 and connected via a flange connection to a hollow shaft (pipe section 17) that is or can be driven by the drive means 6.

The rotating container 20 thus has the form of a rotating flask in the illustrated examples of execution.

To drive the rotating container 2, the drive means 6 comprises an electric drive not illustrated in greater detail and which, as a rule, comprises a motor and gears. The rotating speed of the drive or motor can be controlled or regulated.

To control or regulate the rotating speed of the drive means 6, the drive means 6 is connected with a control and/or regulating mechanism 60 that controls the drive means 6 via a control signal designated SC. The usually electric control signal SC is provided at an output of the control and/or regulating mechanism 60 and is transferred according to FIG. 1 or FIG. 3 via a control signal line 46, usually a flexible electric cable, and according to FIG. 2 via an electrical connection illustrated in schematic form. The control signal SC for the drive means, generated by the control and/or regulating mechanism 60, is a direct or clear measure for the rotating speed of the rotating container 2 to be set by the drive means 6. The rotating speed corresponds to the number of the rotations of the rotating container 2 around the axis of rotation R per unit of time or the rotation frequency of the rotating container 2. Another equivalent value is the angular velocity of the rotating container 2, which corresponds to the rotating speed multiplied by a factor of $2\pi$.

At one or more inputs of the control and/or regulating mechanism 60, measuring signals or sensor signals are fed to the control and/or regulating mechanism 60 that each represent a measure for a process value of the evaporation process. From the received measuring or sensor signals, the control and/or regulating mechanism 60 derives the control signal SC for setting the rotating speed of the drive means 6. The control and/or regulating mechanism 60 and a measuring mechanism or sensors for measuring the process value/s together form a control mechanism to control the evaporation process.

The control and/or regulating mechanism 60 is illustrated in the form of construction according to FIG. 1 or FIG. 3 as an external control and/or regulating mechanism that can be used as a remote control, for example. According to FIG. 2, the control and/or regulating mechanism 60 is integrated inside the support 9. The arrangement of the control and/or regulating mechanism 60 is not decisive for its operation and is chosen according to the specific applications of the rotary evaporator.

During operation of the rotary evaporator, the liquid bath 3 with the liquid F. generally consisting essentially of water is regulated as heat transfer medium by a heating (not illustrated) to a desired temperature or a desired temperature profile for the rotary evaporation process.

The control and/or regulating mechanism 60 then controls the drive means 6 in such a way that it causes the rotating container 2 to rotate at a rotating speed dependent on the control signal SC of the control and/or regulating mechanism 60. The rotating speed is set to a value at which, due to the rotation of the rotating container 2 around the axis of rotation R, a thin film MF, particularly a liquid film, of the medium M is generated on the inner wall of the receiving area 20 with the substance/s to be evaporated. From this film MF of the medium M, by means of the thermal energy supply from the liquid F, the substance is evaporated in controlled manner and fed upward through the sleeve 21, the line 26 and the line 27 as vapor or gas line to the condenser 4.

The design of the film MF on the inner wall of the rotating container 2 can depend on a number of process values or be influenced by them. These process values include particularly the properties of the medium M itself.

A characteristic of the medium M that can negatively influence the film formation of the film MF and the evaporation capacity is the foaming or a foam formation during the evaporation process. On the portion of the inner wall of the rotating container 2 to which the foam adheres, no film MF or no ideal film MF of the medium M can form.

In order to eliminate or at least reduce the problem of foam formation, the control device for controlling the evaporation process via the rotating speed of the rotating container 2 comprises, in addition to the control and/or regulating mechanism 60 according to FIG. 1, also two foam sensors 14 and 15 to detect a foam formation in the inside of the rotating container 2. The arrangement of the foam sensors 14 and 15 on the rotating container 2 is such that one of the two foam sensors 14 and 15 transmits a signal received from the control and/or regulating mechanism and the other of the two foam sensors 14 and 15 receives the signal reflected from the foam of the medium M and feeds it to the control and/or regulating mechanism 60. In the form of construction according to FIG. 1, particularly the foam sensor 14 can emit a signal SA that is fed to it from the control and/or regulating mechanism 60 via the line 44, and the foam sensor 15 can feed the reflected signal (reflection signal) as sensor signal SB via the line 45 to the control and/or regulating mechanism 60. The sensor signal SB of the foam sensor 15 is then a direct measure for the expansion of the foam of the medium M in the rotating container 2, since the reflective behavior in the receiving area 20 of the rotating container 2 changes as the foam expands.

Depending on the received reflection signal or sensor signal SB of the foam sensor 15, the control and/or regulating mechanism 60 derives a control signal SC that is fed via the line 46 of the drive means 6 and adapts the rotating speed of the drive means 6 and thus of the rotating container 2 according to the foam detected in the rotating container 2.

Thus, the rotating speed will have to be modified in the event of a foam formation in the rotating container 2 that is above an acceptable tolerance value. In order to ensure good efficiency of the rotary evaporator, the rotating speed cannot reach a value at which an ideal film is no longer formed.

The foam sensors 14 and 15 are preferably optic sensors or infrared sensors or also radar sensors. Both foam sensors 14 and 15 can also be operated in the transmitting as well as the receiving mode or the foam sensor 15 can serve as transmitter and the foam sensor 14 as receiver. Recognition of foam formation in the rotating container 2 can also take place with the help of cameras and a corresponding evaluation, e.g. pattern recognition or brightness analysis, as the foam sensor. Detection of a foaming of the product or medium M can be improved even more by attaching several foam sensors.

In the example of execution according to FIG. 2 and the example of execution according to FIG. 3, an inclinometer 16 is arranged as a sensor on the swiveling axis S for the rotating container 2. The inclinometer 16 detects the swivel position of the rotating container 2, that is, the position of the corresponding shaft relative to a reference rotating position. In FIG. 2, this swivel position corresponds to the angle α between the axis of rotation R and the horizontal H'. This angle of inclination a then changes with the rotating speed of the rotating container 2. The sensor signal SD of the inclinometer 16 is thus dependent upon the rotating speed of the rotating container 2. The inclinometer 16 preferably comprises a rotational potentiometer the output potential of which is proportional to the angle of inclination a.

According to FIG. 2 and FIG. 3, the sensor signal SD of the inclinometer 16 is fed to the control and/or regulating mechanism 60, namely according to FIG. 2 via an electrical connection illustrated in schematic form and according to FIG. 3 via a flexible electric cable as sensor signal line 48.

If the sensor signal SD of the inclinometer 16 corresponding to the angle of inclination a is then detected at two different rotation angle positions of the rotating container 2, e.g. two rotation angle positions offset at a 90° angle to each other, one thus obtains differing sensor signals SD 1 and SD 2 at the two rotation angle positions due to the unequal mass distribution of the medium M on the inside of the rotating container 2.

The sensor signal SD or SD 1 and SD 2 of the inclinometer 16 scanned at the two offset rotation angle positions is evaluated by the control and/or regulating mechanism 60, which interprets from this the rotating behavior of the rotating container 2 with the medium M depending on the product or medium M that is in the rotating container 2 and the respective rotating speed.

If, for example, sensor signals SD 1 and SD 2 that are increasingly fluctuating or increasingly changing are ascertained at the two rotation angle positions or signal differences SD 1–SD 2 between the sensor signals SD 1 and SD 2 at the two rotation angle positions, it can be concluded from this that no uniform film or no uniform layer is being generated on the inner wall of the rotating container 2, but rather the film thickness or layer thickness is becoming increasingly uneven. This can progress until a portion of the product or medium M in the rotating container 2 adheres as an eccentric mass to the inner wall of the rotating container 2, particularly in the case of high viscosity of the medium M or very strong adhesion forces.

To counteract this effect reducing the evaporator capacity, the control and/or regulating mechanism 60 regulates the rotating speed of the rotating container 2 so as to ensure the most uniform possible film application or layer thickness on the inner wall of the rotating container 2.

For this purpose, the variation or change in the sensor signals SD of the inclinometer 16 are accordingly reduced by setting the rotating speed of the drive means 6. The sensor signal SD is thus regulated in such a way that the changes or signal differences for the two rotation angle positions remain within a predetermined tolerance range. The regulating value of the regulating circuit is thus the sensor signal SD, which is a measure for the mass distribution in the rotating container 2, and the setting value is the rotating speed of the rotating container 2, which is predetermined via the drive means 6.

Such vibrations of the rotating container 2 caused by the mass distribution or the mass moment of inertia of the medium M in the rotating container 2 can also be detected by means of other sensors instead of with an inclinometer 16, particularly with mechanical sensors for detecting pressure and/or force or with acoustic sensors that detect an acoustic vibration (sound wave) caused by the vibration.

Instead of measuring the vibration of the rotating container 2, in another form of construction not illustrated, the electric current consumption or power consumption of the motor of the drive means 6 can be measured The changes in the current or power of the motor of the drive means 6 over time and dependent upon the rotation angle position of the rotating container 2 and/or the rotating speed of the rotating container 2 can also be evaluated by the control and/or regulating mechanism 60 in order to optimally adjust the rotating speed of the rotating container 2. This is particularly advantageous when a relative speed between the medium M and the rotating container 2 is to be detected and maintained, that is, one needs to ensure that no stationary condition sets in. Thus, a change in the power consumption during an acceleration or a jump can be used as a measure for the relative speed.

The mass moment of inertia of the rotating container 2 with contents, that is, filled with the medium M, can also be determined in another form of construction by measuring the time required to accelerate or slow down the rotating container 2 from a first rotating speed to a second rotating speed. Since the rotating container 2 itself is an essentially unchanging body, changes in these times are a direct measure for changes in the mass moment of inertia of the medium M in the rotating container 2. In this connection, the change over time in the mass moment of inertia is of particular interest. This measurement of the mass moment of inertia or a change in the mass moment of inertia can take place within a rotation of the rotating container 2.

The sensors SA, SB according to FIG. 1 or SD according to FIG. 2 or FIG. 3 can be analog signals or digital signals depending on the type of sensor used 14, 15 or 16. The control and/or regulating mechanism 60 typically contain at least one microprocessor or signal processor to derive the control signal SC from the sensor signal SA or SB or SD. In the case of an analog sensor signal SA, SB or SD, the control and/or regulating mechanism 60 contain an analog/digital converter connected upstream from the microprocessor. The digital control signal (or control value) calculated by the microprocessor can be converted or amplified into an analog or digital control signal SC at the output. The control and/or regulating mechanism 60 can also contain analog components for signal processing, however.

Particularly if the medium M is a powder or powder-like product, it may be sensible to also at least temporarily change the direction of rotation of the rotating container 2, which is designated by DR in FIGS. 1 and 2, or to carry out a rotation direction change that is repeated for a predetermined period of time. This change in direction of rotation can be used to obtain more precise statements on the ideal or nearly ideal rotating speed of the rotating container 2. As a special case, a rising and decreasing rotating speed of the rotating container 2 should be mentioned at this point. For this reason, powder or powder-like products or media M in the rotating container 2 should be considered problematic because they often form areas that are not homogenous, e.g. due to differences in the thickness caused by the non-optimal setting of the rotating speed of the rotating container 2 or clumping of the powder or powder-like product due to electrostatic effects.

The sensors to detect process values can be attached to different places that are not limited to the illustrated forms of construction. For example, sensors can also be provided on the drive means 6, e.g. extensometers, pressure or force sensors, optic sensors, radar sensors or inclinometers, or on the liquid bath 3, e.g. pressure and force sensors, optic sensors, radar sensors or level sensors, or on the housing and/or frame of the rotary evaporator, particularly the support 9; in this case, particularly pressure and force sensors, optic sensors or radar sensors can be used, or at other places in the vicinity of the rotary evaporator at which clear signals can be received, e.g. contact-free sensors such as optic, acoustic, capacitive, inductive or radar sensors.

In regulating terms, the setting and regulating of the rotating speed of the rotating container 2 preferably takes place in that the relevant process value/s is/are measured as the regulating value in a regulating circuit and is/are regulated at a predetermined guide value or target value by setting or controlling the rotating speed of the rotating container and, if necessary, also the rotating direction of the rotating container. When setting the rotating speed of the rotating container, a conventional rotating speed regulator can of course also be provided in the drive means 6 to keep the adapted rotating speed of the rotating container constant. This rotating speed regulator is not to be confused with the process-based setting of the rotating speed of the rotating container.

In the condenser 4 according to FIG. 1 (or FIG. 2), a heat exchanger 40 is also provided for by means of which the vapor releases its heat and condenses it out again as liquid in the condenser 4. The condensate or distillate is collected in a distillate collector 41 in the lower area of the condenser 4 and fed to a distillate-collecting container 5 via a line 35 at the lower end of the distillate collector 41, a valve 11, another line 31, a valve 12 and another line 34.

The valve 12 is designed as a three-way valve or tap and connects the line 31 not only with the line 34 but also with the already mentioned line 32. Depending on the setting of the valve 12, a portion of or the entire distillate that flows through the line from the distillate collector 41 can be forwarded into the line 32 and thus back into the receiving area 20 of the rotating container 2. A reflux mechanism is thus formed to return already evaporated and again condensed-out distillate from the condenser 4 back into the receiving area 20 of the rotating container 2.

If the valve 11 is blocked, the distillate collector 41 of the condenser 4 is overflowed and the distillate no longer flowing via the line 35 then flows via the vapor line, that is, the lines 27 and 26 as well as the sleeve 21 as a reflux mechanism, directly back into the receiving area 20 of the rotating container 2. In this way, an improved self-cleaning of the vapor line is achieved.

The vapor line for the evaporated product is thus kept very short and runs practically along the vertical rising direction of the vapor.

In normal circumstances, the product or medium M, originating from the product container 7, in the receiving area 20 of the rotating container 2 contains at least two components with different boiling points or evaporation temperatures, such that only one of or a portion of the contained substances with a lower boiling point are evaporated during the rotary evaporation process and the substance/s with the higher boiling points remain in the rotating container 2. In this way, a concentration or distillation of the initial product can be achieved.

| List of reference numbers and symbols | |
|---|---|
| 2 | rotating container |
| 3 | liquid bath |
| 4 | condenser |
| 5 | distillate collecting container |
| 6 | drive means |
| 7 | product container |
| 8 | housing |
| 9 | support |
| 10 | swivel bearing |
| 11, 12, 13 | seal |
| 14, 15 | foam sensor |
| 16 | inclinometer |
| 20 | rotating container |
| 21 | sleeve |
| 22 | hollow shaft |
| 23 | receiving device |
| 24, 25 | line part |
| 31 through 36 | line |
| 40 | heat exchanger |
| 41 | distillate collector |
| 44, 45 | sensor signal line |
| 46 | control signal line |
| 48 | signal line |
| 50 | compensating element |
| 55 | damping device |
| 57 | counterweight |
| 58 | bottom |
| 60 | control and/or regulating mechanism |
| DR | direction of rotation |
| F | liquid |
| G | gravity |
| H, H' | horizontal |
| R | axis of rotation |
| S | swiveling axis |
| SA, SB | sensor signal |
| SC | control signal |
| P1 | upper intersection |
| P2 | lower intersection |
| α, β | angles |

The invention claimed is:

1. Device for evaporating at least one substance with
   a) a rotary container (2) for receiving a medium (M), that comprises the at least one substance to be evaporated,
   b) a drive means (6) to rotate the rotary container around an axis of rotation (R) inclined against the direction of gravity (G),
   c) a control mechanism (60, 14, 15, 16) in an active connection with the drive means
      c1) to detect at least one process value and
      c2) to automatically control or regulate the speed of the rotary container depending on the process value/s detected, and with
   d) a heat transfer bath (3), into which the rotating container is or can be at least partially dipped during operation and by means of which the rotating container is or can be brought to temperatures suitable for evaporating the substance/s to be evaporated wherein
   e) the control mechanism controls or regulates the rotary speed of the rotary container in such a way that in the lower area of the rotary container, there is a reservoir of the medium drawn downward by gravity and out of which, at least on a portion of the inner wall of the rotary container, a film of the medium (MF) is formed that is at least approximately uniform and/or favorable for the evaporation and is constantly at least partially renewed.

2. Device according to claim 1, in which at least one substance to be evaporated or the medium is essentially liquid.

3. Device according to claim 1, in which the at least one substance to be evaporated or the medium consists essentially of solid particles, particularly in powder or granulate form.

4. Device according to claim 3, in which the control mechanism controls or regulates the rotary speed of the rotating container so as to produce the best possible mixing of the particles of the substance/s to be evaporated or of the medium.

5. Device according to claim 1, in which the control mechanism controls or regulates the rotating speed of the rotating container so as to produce the best possible heat transfer within the substance/s to be evaporated or the medium.

6. Device according to claim 1, in which the rotating container is also able to swivel around a swiveling axis (5) freely at least in a predetermined swivel area, and the control mechanism detects a pivoting angle (α) of the rotating container relative to a reference position (H') as the process value.

7. Device according to claim 1, in which the axis of rotation concurs with a primary axis of inertia of the rotating container, preferably with an axis of symmetry with respect to which the rotating container is designed rotationally symmetrical.

8. Device according to claim 1, in which the control mechanism detects as process value the vibration behavior, particularly a resonance behavior, of the rotating container or of a body mechanically connected with the rotating container, particularly the drive means or parts thereof such as, for example, a drive shaft or a transfer mechanism or the heat transfer bath.

9. Device according to claim 1, in which the control mechanism detects as process value/s the mass distribution, mass moment of inertia and/or a change in the mass distribution or, respectively, in the mass moment of inertia of the substance/s to be evaporated or of the medium.

10. Device according to claim 9, in which the control mechanism detects the mass moment of inertia by measuring the time required to accelerate or slow down the rotating container from a first rotating speed to a second rotating speed.

11. Device according to claim 1, in which the control mechanism controls or regulates the rotating speed of the rotating container depending on a comparison of the current process value detected with the rotating container filled with the substance/s on the one hand and, on the other hand, the reference process value detected beforehand when the rotating container is not filled with the substance/s.

12. Device according to claim 1, in which the control mechanism detects as process value the drive power required of the drive means in order to rotate the rotating container.

13. Device according to claim 1, in which the control mechanism (60, 14, 15) detects as process value a foam formation in the rotating container.

14. Device according to claim 1, in which the control mechanism detects the process value for at least two different rotation angle positions of the rotating container and controls or regulates the rotating speed depending on the measured values of the process value for these at least two different rotation angle positions.

15. Device according to claim 14, in which the control mechanism controls or regulates the rotating speed depending on the measured values of the process value for the at least two different rotation angle positions in such a way that discrepancies between these measured values are within a predefined tolerance range.

16. Device according to claim 1, in which the drive means is designed so that it is possible for the rotating container to rotate in both rotation directions around the axis of rotation, and the control mechanism changes the direction of rotation of the rotating container in a predetermined manner, particularly at regular intervals.

17. Device according to claim 16, in which the control mechanism controls or regulates the turning direction of the rotating container depending on at least one process value.

18. Device according to claim 1, in which the control mechanism maintains as process value a relative speed between the rotating container and the medium situated in the rotating container.

19. Device according to claim 1, in which the control mechanism to detect at least one process value comprises one or more sensors (14, 15, 16) from the group comprising the following sensors: acoustic sensors; sensors measuring electromagnetic rays, particularly optic or infrared sensors or radar sensors; position sensors, particularly level sensors, position sensors or angle position indicators such as inclinometers, sensors detecting electric and/or magnetic fields, particularly capacitive or inductive sensors, field strength sensors; power and/or force and/or weight sensors;
expansion sensors, electric current or output sensors.

20. Device for evaporating at least one substance with
a) a rotary container (2) for receiving a medium (M), that comprises the at least one substance to be evaporated,
b) a drive means (6) to rotate the rotary container around an axis of rotation (R) inclined against the direction of gravity (G), and with
c) a control mechanism (60, 14, 15, 16) in an active connection with the drive means
    c1) to detect at least one process value and
    c2) to automatically control or regulate the speed of the rotary container depending on the process value/s detected,
wherein
d) the control mechanism controls or regulates the rotary speed of the rotary container in such a way that in the lower area of the rotary container, there is a reservoir of the medium drawn downward by gravity and out of which, at least on a portion of the inner wall of the rotary container, a film of the medium (MF) is formed that is at least approximately uniform and/or favorable for the evaporation and is constantly at least partially renewed, and e) the control mechanism detects as process value the viscosity of the medium situated in the rotating container.

21. Process for evaporating at least one substance, in which
a) a medium (M) that contains the at least one substance to be evaporated is introduced into a rotating container (2),
b) the rotating container is rotated around an axis of rotation (R) inclined against gravity,
c) at least one process value is detected,
d) depending on the at least one process value detected, the rotating speed of the rotating container is automatically controlled or regulated in such a way that in the lower area of the rotating container, a reservoir of the medium drawn downward by gravity is formed out of which, at least on a portion of the inner wall of the rotating container, a film of the medium is generated that is preferably at least approximately uniform and/or favorable for the evaporation and is constantly at least partially renewed, and
e) the rotating container is rotated in a heat transfer bath (3) and is thereby brought to temperatures suitable for evaporating the substance/s to be evaporated.

22. Process according to claim 21, in which at least one substance to be evaporated or the medium is essentially liquid.

23. Process according to claim 21, in which at least one substance to be evaporated or the medium consists essentially of solid particles, particularly in powder or granulate form.

24. Process according to claim 23, in which the rotating speed of the rotating container is controlled or regulated so as to achieve the best possible mixing of the particles of the substance/s to be evaporated or of the medium.

25. Process according to claim 21, in which the rotating speed of the rotating container is controlled or regulated so as to achieve the best possible heat transfer within the substance/s to be evaporated or the medium.

26. Process according to claim 21, in which the vibration behavior, particularly a resonance behavior, of the rotating container or of a body mechanically connected with the rotating container, particularly the drive means or a carrier unit, is detected as the process value.

27. Process according to claim 21, in which the mass distribution, the mass moment of inertia and/or a change in the mass distribution or the mass moment of inertia of the substance/s to be evaporated or of the medium in the rotating container is detected as the process value/s.

28. Process according to claim 21, in which the rotating speed of the rotating container is controlled or regulated depending on a comparison of the current process value detected with the rotating container filled with the substance/s on the one hand and, on the other hand, the reference process value detected beforehand when the rotating container is not filled with the substance/s.

29. Process according to claim 21, in which the mass moment of inertia is detected by measuring the time required to accelerate or to slow down the rotating container from a first rotating speed to a second rotating speed.

30. Process according to claim 21, in which the drive power required to rotate the rotating container is detected as the process value.

31. Process according to claim 21, in which the rotating container can be swiveled around a swiveling axis (S) and a pivoting angle (α) of the rotating container relative to a reference position is detected as the process value.

32. Process according to claim 21, in which a foam formation in the rotating container is detected as the process value.

33. Process according to claim 21, in which the process value is detected at at least two different rotation angle positions of the rotating container and the rotating speed is controlled or regulated depending on the measured values of the process value for these at least two different rotation angle positions.

34. Process according to claim 33, in which the rotating speed is controlled or regulated depending on the measured values of the process value for the at least two different rotation angle positions in such a way that discrepancies between these measured values are within a predefined tolerance range.

35. Process according to claim 21, in which the direction of rotation of the rotating container is changed in a predetermined manner, particularly at regular intervals.

36. Process according to claim 35, in which the direction of rotation of the rotating container is controlled or regulated depending on at least one process value.

37. Process according to claim 21, in which the viscosity of the medium that is in the rotating container is detected as the process value.

38. Process according to claim 21, in which as the process value, a relative speed between the rotating container and the medium is kept above a specific minimum value.

* * * * *